(12) United States Patent
Romrell

(10) Patent No.: US 10,931,727 B2
(45) Date of Patent: Feb. 23, 2021

(54) TRANSPARENT INTERCEPT FOR ADAPTIVE BITRATE SPLICER

(71) Applicant: ARRIS Enterprises LLC, Suwanee, GA (US)

(72) Inventor: David A. Romrell, Hillsboro, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 167 days.

(21) Appl. No.: 15/085,383

(22) Filed: Mar. 30, 2016

(65) Prior Publication Data

US 2017/0289228 A1   Oct. 5, 2017

(51) Int. Cl.
*H04L 29/06* (2006.01)
*H04N 21/81* (2011.01)
(Continued)

(52) U.S. Cl.
CPC ........ *H04L 65/605* (2013.01); *H04L 65/4076* (2013.01); *H04L 65/4084* (2013.01); *H04L 65/601* (2013.01); *H04L 65/602* (2013.01); *H04L 67/20* (2013.01); *H04N 21/2187* (2013.01); *H04N 21/23424* (2013.01); *H04N 21/23614* (2013.01); *H04N 21/25841* (2013.01); *H04N 21/25883* (2013.01); *H04N 21/2668* (2013.01); *H04N 21/64322* (2013.01); *H04N 21/812* (2013.01); *H04L 61/2514* (2013.01); *H04L 61/2592* (2013.01); *H04L 67/02* (2013.01); *H04N 21/6125* (2013.01)

(58) Field of Classification Search
CPC ............ H04N 21/812; H04N 21/2668; H04N 21/435; H04N 21/23424; H04N 21/25841; H04N 21/2347; H04N 21/4524; H04N 21/4532; H04L 65/605; H04L 65/4076; H04L 65/4084; H04L 65/601; H04L 65/602; H04L 67/02; H04L 61/2592
See application file for complete search history.

(56) References Cited

U.S. PATENT DOCUMENTS 6,101,543 A  *  8/2000  Alden ............... H04L 29/12028
                                                           709/225
9,338,192 B1 *  5/2016  He ........................ H04L 65/1069
(Continued)

*Primary Examiner* — Mohamed A. Wasel
*Assistant Examiner* — Rachel J Hackenberg
(74) *Attorney, Agent, or Firm* — Chernoff, Vilhauer, McClung & Stenzel, LLP

(57) ABSTRACT

Methods, systems, and computer readable media can be operable to facilitate the intercept and manipulation of content requested by a client device. The methods, systems, and apparatuses described herein enable the interception and redirection of packets based upon a set of rules. Intercepted packets may be redirected away from an origin server and may be forwarded to a splicing device. The splicing device may establish a session with a corresponding origin server, and retrieve content that is requested by the intercepted packet. In embodiments, the splicing device may identify alternate content that is associated with the intercepted packet and/or content that is further associated with a device or subscriber associated with the packet. One or more segments of the requested content, or the entirety of the requested content may be replaced with the alternate content, and the modified content may be output to the client device requesting the content.

20 Claims, 4 Drawing Sheets

(51) Int. Cl.
*H04N 21/643* (2011.01)
*H04N 21/234* (2011.01)
*H04N 21/258* (2011.01)
*H04N 21/236* (2011.01)
*H04N 21/2187* (2011.01)
*H04N 21/2668* (2011.01)
*H04L 29/08* (2006.01)
*H04L 29/12* (2006.01)
*H04N 21/61* (2011.01)

(56) References Cited

U.S. PATENT DOCUMENTS

| | | | |
|---|---|---|---|
| 9,706,233 B2* | 7/2017 | Gordon | H04N 21/23424 |
| 9,917,743 B2* | 3/2018 | Natham | H04L 41/50 |
| 2011/0264530 A1* | 10/2011 | Santangelo | G06Q 30/0251 |
| | | | 705/14.64 |
| 2011/0289108 A1* | 11/2011 | Bhandari | H04N 21/234309 |
| | | | 707/769 |
| 2014/0259048 A1* | 9/2014 | Brueck | H04L 65/601 |
| | | | 725/32 |
| 2017/0104786 A1* | 4/2017 | Gero | H04L 63/166 |

* cited by examiner

TRANSPARENT INTERCEPT FOR ADAPTIVE BITRATE SPLICER

TECHNICAL FIELD

This disclosure relates to transparent intercept for an adaptive bitrate splicer.

BACKGROUND

Live streaming video has traditionally been delivered using a multiple program transport stream (MPTS) over an Internet protocol (IP) multicast. Multicast splicers were created to allow operators to intercept and enhance these programs for downstream users. The multicast splicer enabled the content providers to generate an incentive for the operators to carry the content providers' network by including cues for local dynamic advertisement insertion (e.g., replacing national advertisements with targeted advertisements). Multicast splicers also enable other features such as providing alternate content during a regional blackout event.

Television viewing is moving to IP video formats such as Apple HLS (Hypertext Transfer Protocol (HTTP) live streaming), Microsoft Smooth and Adobe Flash. These formats use a technique referred to as segmented HTTP transport (SHT). Using the SHT technique, a user device (e.g., customer premise equipment (CPE) device or other client device such as a mobile device or tablet) pre-fetches video in segments, stores the segments in memory, decodes the segments and presents the video in a continuous manner. The user device fetches segments as needed so that the segment count does not drop below a threshold and the user device can continuously play the IP video stream without interruption. The user device typically fetches segments from a list of segments called an index file or manifest file. The index file or manifest file is typically downloaded as the user device starts a session and can be refreshed periodically to accommodate live streams that have no predetermined endpoint.

Another feature that has been layered on top of SHT is referred to as adaptive bitrate streaming. Rather than encoding a piece of video for a single quality or bitrate, adaptive streaming encodes a piece of video for multiple bitrates. In effect, systems using adaptive bitrate streaming produce multiple versions of the same piece of video, one for each bitrate. In this instance, the manifest file construct is extended with information that allows the user device to request different bitrates as it adapts to network traffic.

The user device typically uses a variety of algorithms to determine which bitrate to choose. In some implementations, if operating conditions such as network congestion or central processing unit (CPU) load cause the user device to run out of data or drop video frames, then the device may choose a lower quality version for the next segment in the sequence. In other implementations, if the content is arriving quickly, the user device may request a higher quality version of the next segment in the sequence.

Another improvement added to adaptive bitrate streaming is live streaming. Because, during live streaming, content is being encoded in real-time and new segments are being created, the manifest file is typically being constantly updated. Further, because content is being produced and consumed in real-time the user device is typically constantly requesting an updated version of the manifest file to get information on how to request the newly added segments of video.

The demand and proliferation of mobile devices, Internet connected televisions, and web based viewing has led to disruption and replacement of traditional multicast delivery systems. Live linear streaming is migrating to HTTP adaptive bitrate streaming from a content delivery network (CDN). From a high-level perspective, CDN cache nodes perform fan-out network efficiencies that are similar to the multicast features of routers and switches.

However, HTTP adaptive bitrate streaming lacks a solution for splicing content to include targeted advertising and lacks regional solutions for including alternate content during regional blackouts or other events creating a need for alternate content. Moreover, deployment of a CDN comes at a greater cost than traditional multicast switches and routers. Downstream transmissions generally require a full load as CDNs are generally located at large central locations, and a CDN is only operable to reduce traffic for content that is pushed into it, not traffic such as over-the-top (OTT) content that is hosted at a different location. Therefore, it is desirable to improve upon systems and methods for manipulating and delivering content to subscribers through adaptive bitrate streaming.

BRIEF DESCRIPTION OF THE DRAWINGS

Like reference numbers and designations in the various drawings indicate like elements.

DETAILED DESCRIPTION

Figure 1:
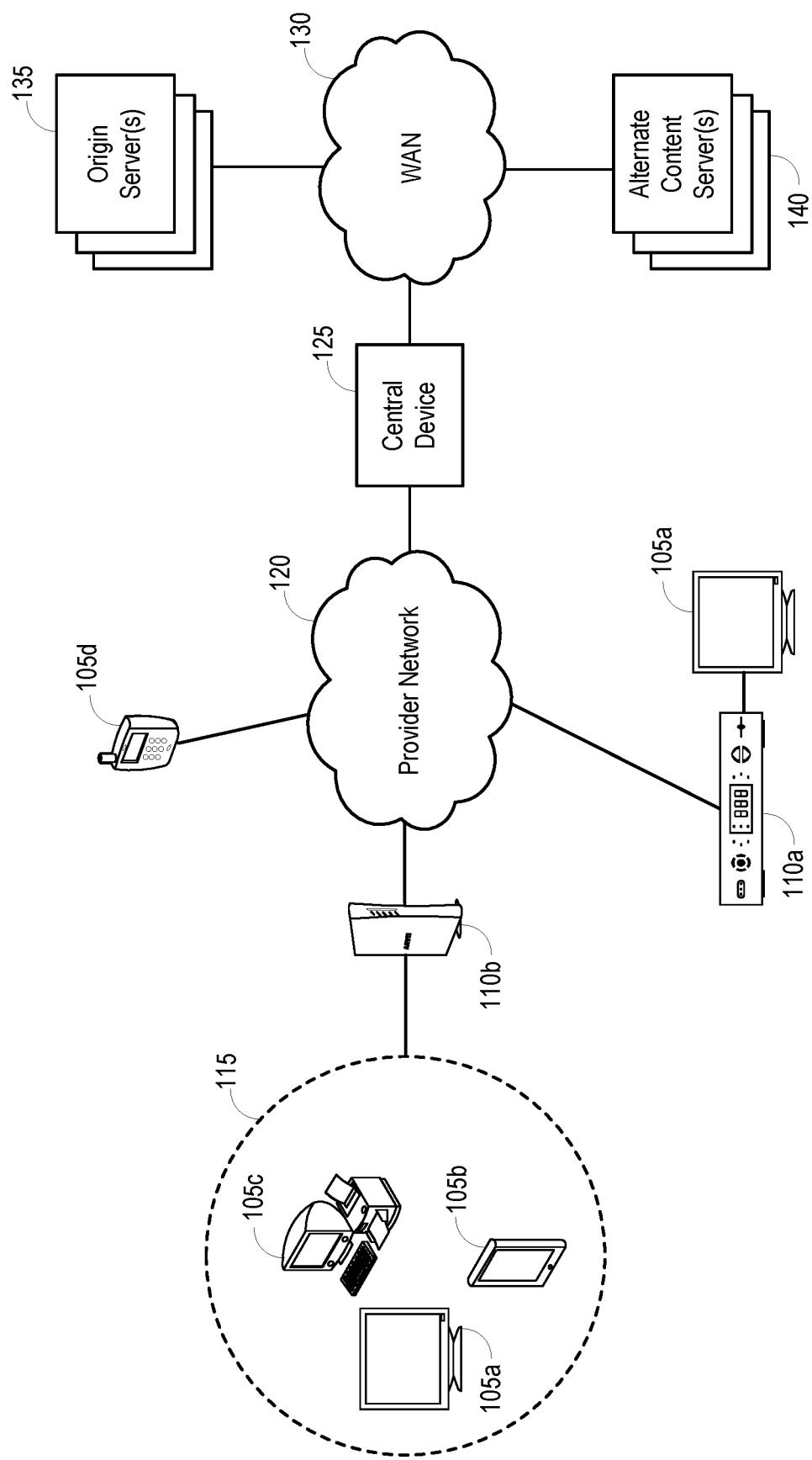
FIG. 1 is a block diagram illustrating an example network environment operable to facilitate the intercept and manipulation of content requested by a client device.

It is desirable to improve upon methods and systems for manipulating content requested by a client device. Methods, systems, and computer readable media can be operable to facilitate the intercept and manipulation of content requested by a client device. The methods, systems, and apparatuses described herein enable the interception and redirection of packets based upon a set of rules. Intercepted packets may be redirected away from an origin server and may be forwarded to a splicing device. The splicing device may establish a session with a corresponding origin server, and retrieve content that is requested by the intercepted packet. In embodiments, the splicing device may identify alternate content that is associated with the intercepted packet and/or content that is further associated with a device or subscriber associated with the packet. One or more segments of the requested content, or the entirety of the requested content may be replaced with the alternate content, and the modified content may be output to the client device requesting the content.

In embodiments, a transparent intercept splicer may be configured to perform the function of a manifest manipulator for streaming video (e.g., adaptive bitrate streaming). The transparent intercept splicer may provide localized/personalized views of a national broadcast stream for dynamic ad-insertion, addition of alternate content for a blackout event, or other types of alternate content.

Systems and methods described herein provide for a transparent intercept splicer that can be integrated with various network devices (e.g., headend device, midstream network gear such as a switch or router, etc.). The transparent intercept splicer described herein may be configured to enable a headend device, such as a cable modem termination system (CMTS), a gateway, and other network devices to be extended as an advertisement insertion tool. The transparent intercept splicer may be configured to target and insert advertisements for content streams received from various sources including a content delivery network (CDN), over-the-top (OTT) sources, and other content sources. The transparent intercept splicer may enable adaptive bitrate streaming without a CDN, and can provide fan-out efficiencies when positioned closer to the edge of a network.

An embodiment of the invention described herein may include a method comprising: (a) receiving a packet at an intercept device, the packet being output from a user device, wherein the packet comprises a request for content from an origin server; (b) determining that the packet is to be redirected to an intercept splicer; (c) forwarding the packet to the intercept splicer; (d) establishing a session between the intercept splicer and the origin server; (e) retrieving the requested content from the origin server; (f) identifying one or more alternate pieces of content, wherein the one or more identified alternate pieces of content are associated with the user device; (g) replacing at least one segment of the requested content with one or more of the identified alternate pieces of content to generate modified content; and (h) routing the modified content to the user device.

According to an embodiment of the invention, determining that the packet is to be redirected to an intercept splicer comprises: (a) identifying the origin server associated with the packet; and (b) matching the identified origin server with an origin server that is identified within a list of origin servers, wherein the list of origin servers dictates that packets requesting content from an origin server within the list of origin servers are to be redirected to the intercept splicer.

According to an embodiment of the invention, the method described herein further comprises preserving address and port information associated with the packet by encapsulating the packet within a wrapper before forwarding the packet to the intercept splicer.

According to an embodiment of the invention, the one or more alternate pieces of content comprise one or more targeted advertisements.

According to an embodiment of the invention, the one or more alternate pieces of content comprise a single piece of content, and the entirety of the requested content is replaced with the single piece of content.

According to an embodiment of the invention, the one or more identified alternate pieces of content are associated with a geographical location of the user device.

According to an embodiment of the invention, the method described herein further comprises outputting, to an external server, analytics associated with the replacement of requested content with alternate content.

According to an embodiment of the invention, the intercept splicer is integrated into the intercept device.

An embodiment of the invention described herein may include a system comprising: (a) an interface configured to be used to receive a packet, the packet being output from a user device, wherein the packet comprises a request for content from an origin server; (b) an intercept module configured to: (i) determine that the packet is to be redirected to a splicer module; and (ii) forward the packet to the splicer module; (c) wherein the splicer module is configured to: (i) establish a session between the splicer module and the origin server; (ii) retrieve the requested content from the origin server; (iii) identify one or more alternate pieces of content, wherein the one or more identified alternate pieces of content are associated with the user device; and (iv) replace at least one segment of the requested content with one or more of the identified alternate pieces of content to generate modified content; and (d) an interface configured to be used to route the modified content to the user device.

An embodiment of the invention described herein may include one or more non-transitory computer readable media having instructions operable to cause one or more processors to perform the operations comprising: (a) receiving a packet at an intercept device, the packet being output from a user device, wherein the packet comprises a request for content from an origin server; (b) determining that the packet is to be redirected to an intercept splicer; (c) forwarding the packet to the intercept splicer; (d) establishing a session between the intercept splicer and the origin server; (e) retrieving the requested content from the origin server; (0 identifying one or more alternate pieces of content, wherein the one or more identified alternate pieces of content are associated with the user device; (g) replacing at least one segment of the requested content with one or more of the identified alternate pieces of content to generate modified content; and (h) routing the modified content to the user device.

FIG. 1 is a block diagram illustrating an example network environment 100 operable to facilitate the intercept and manipulation of content requested by a client device. In embodiments, video, voice, and/or data services may be delivered to one or more client devices 105*a-d*. Client devices 105*a-d* may include a television 105*a*, tablet 105*b*, computer 105*c*, mobile device 105*d*, gaming console (not shown), and any other device operable to receive video, voice, and/or data services. It should be understood that various multimedia services may be delivered to the client devices 105*a-d*, including but not limited to, linear or broadcast television, video-on-demand (VoD) content, pay-per view content, recorded content (e.g., digital video recorder (DVR), network DVR (nDVR), or personal video recorder (PVR) content), audio-only content, and streaming content such as YouTube or Netflix content.

In embodiments, one or more client devices 105*a-d* may receive video, voice, and/or data services through a connection to a customer premise equipment (CPE) device 110*a-b*. For example, a television 105*a* may receive services from a set-top box 110*a*, and one or more client devices (e.g., television 105*a*, tablet 105*b*, computer 105*c*, mobile device 105*d*, etc.) may receive services through a connection to an access device 110*b* (e.g., gateway device, modem device, wireless network extender, access point, etc.). An access device 110*b* may provide a local network 115 over which communications between client devices 105*a-d* and the access device 110*b* may be passed. The local network 115 may include a local area network (LAN), wireless local area network (WLAN), personal area network (PAN), mobile hotspot network, and others. The access device 110*b* may be integrated with other devices. For example, a modem may reside within a gateway device, STB, or other devices. It will be appreciated by those skilled in the relevant art that delivery of the multiple services over the local network 115 may be accomplished using a variety of standards and formats.

It will be appreciated by those skilled in the relevant art that client devices 105a-d may be capable of interacting and communicating with each other and/or with a CPE device 110a-b over various wireless communication standards (e.g., Wi-Fi, Bluetooth, etc.) or wired communication standards (e.g., Ethernet, Multimedia over Coax Alliance (MoCA), etc.). Client devices 105a-d connected to a local network 115 may receive services according to one or more subscriptions entered into between a subscriber and service provider.

In embodiments, services may be received by client devices (e.g., tablet 105b, mobile device 105d, etc.) directly through a connection to a provider network 120, or may be routed from the provider network 120 to a client device 105a-d through a CPE device 110a-b. The provider network 120 may include an optical network, hybrid fiber coaxial (HFC) network, digital subscriber line (DSL) network, twisted-pair, mobile network, high-speed data network, and others.

In embodiments, a central device 125 may route communications between one or more provider networks 120 and a wide area network (WAN) 130. For example, multiple services (e.g., video, voice, and/or data services) may be delivered from a WAN 130 to a provider network 120 through the central device 125. The central device 125 may be a headend device (e.g., cable modem termination system (CMTS), digital subscriber line access multiplexer (DSLAM), etc.) or any other communication routing equipment. The central device 125 may route upstream and downstream communications to facilitate the delivery of requested content to one or more client devices 105a-d. For example, content residing at one or more servers (e.g., origin servers 135, alternate content servers 140, etc.) may be retrieved through a WAN and delivered to a requesting client device 105a-d.

In embodiments, the central device 125 may include an intercept device configured to intercept client-server traffic (e.g., communications being routed between a CPE device 110a-b or client device 105a-d and an origin server 135). It should be understood that client-server traffic intercept may also be performed by an intercept device located at a load-balancer, content delivery network (CDN) request router, CDN edge cache, in a CPE device 110a-b, or in a software layer to enhance a client device (e.g., client device 105a-d). Performing client-server traffic intercept at an upstream location in a network (e.g., at the central device 125) may provide widespread efficiencies throughout effected components of the downstream network (e.g., communication routing devices existing between the central device 125 and client devices 105a-d). For example, intercepting client-server traffic at the central device 125 may allow for early savings for caching efficiencies (fan-out at the edge) and for allowing filtering/redirect while traffic rates are still reasonable.

In embodiments, traffic may be intercepted and redirected at an intercept device by determining a next hop router for intercepted, upstream packets. High-speed filtering rules, such as ternary content-addressable memory (TCAM), may be used to select packets for handling, and the intercept device may override the next-hop media access control (MAC) addresses associated with the selected packets, such that the selected packets are addressed and delivered to an alternate destination or proxy device (e.g., a transparent intercept splicer).

In embodiments, traffic can be intercepted and redirected at an intercept device by performing high-speed filtering to select packets that are to be embedded inside an Internet protocol (IP) wrapper and routed to an alternate destination or proxy device residing on a different network. Packets selected for redirection may be selected based on a destination of the packets (e.g., IP port). For example, specific upstream transmission control protocol (TCP) packets can be selected based upon a destination indicating that the packets are associated with an adaptive bitrate channel. In embodiments, rules or policies may control which packets are intercepted and redirected by the intercept device, and the rules or policies may be configured and/or updated, for example, by an MSO.

In embodiments, redirected packets may be routed across networks by encapsulating the packets within an IP wrapper such that the original address and port information associated with the packets may be preserved. It should be understood that various redirect protocols may be used to route selected packets to a transparent intercept splicer. For example, packets may be redirected using generic routing encapsulation (GRE), web cache communication protocol (WCCP), and/or any other redirect protocol.

In embodiments, if the return path associated with a selected packet is also encapsulated, then the downstream next-hop MAC address associated with the packet can be determined. For example, a downstream next-hop MAC address may be determined by performing resolution of the network layer address into a link layer address (e.g., using address resolution protocol (ARP)).

It should be understood that other systems and methods may be used for delivery of redirected packets. For example, packets may be delivered over a dedicated network, through a layer-2 MAC address overwrite, over a virtual private network (VPN) tunnel, and others. In embodiments, a transparent intercept splicer application can be run at a network device configured to intercept and redirect packets (e.g., gateway device).

In embodiments, packets intercepted by the intercept device may be redirected to one or more transparent intercept splicers based on various factors. Packets may be redirected across a plurality of transparent intercept splicers such that the loads at the transparent intercept splicers may be balanced. A determination may be made as to the status of a transparent intercept splicer such that packets are redirected to active splicers. In embodiments, diagnostic and/or monitoring information may be communicated between the device intercepting the selected packets and the one or more transparent intercept splicers. Diagnostic and/or monitoring information may be used to track loads at the one or more transparent intercept splicers and to identify and debug issues that may arise at the splicers.

In embodiments, a transparent intercept splicer may extract redirected packets from encapsulation. The origin address of the external session associated with the packet (e.g., the origin server identified as the destination for the redirected packet) may be mapped to an address associated with the transparent intercept splicer. An origin address may be mapped to an address associated with the transparent intercept splicer using address translation (e.g., network address translation (NAT) used to allow mapping of the origin IP:port of the external session to the transparent intercept splicer applications configured IP:port). For example, the origin address may be mapped to a transparent intercept splicer address such that the splicer can accept sessions made to other servers. The stack may also allow retrieving the origin IP and port for backside connections. As an example, packets from a WCCP/GRE tunnel may be redirected to transparent proxy on 3128 using the following rules:

```
#modprobe ip_gre
#ip tunnel add wccp0 mode gre remote {Router-External-
    IP} local {Host-IP} dev {interface}
#ip addr add {Host-IP}/32 dev wccp0
#ip link set wccp0 up
#echo 0>/proc/sys/net/ipv4/conf/wccp0/rp_filter
#iptables-t nat-A PREROUTING-i wccp0-j REDIRECT-
    redirect-to 3128
```

In embodiments, the transparent intercept splicer can accept downstream sessions that are intended for a different origin, retrieve the origin server IP:Port from the NAT or stack, open an upstream session to the origin server IP:port, forward the client requests to the origin server, and forward the origin server responses to the client. Thus, a default forwarding relay can handle unknown traffic types and minimize side effects when traffic is not being processed. If the transparent intercept splicer detects HTTP traffic, the splicer can conform to HTTP standards. For example, following standards may include adding headers for "x-forward-for:" with client IP address and the "Via:" field to identify this proxy type. When performing caching functions, the transparent intercept splicer can honor HTTP caching standards (e.g., standards for refresh, non-cacheable, expiration, etc.). Standard HTTP access logs may provide a source of analytics, monitoring, and diagnostics.

In embodiments, the transparent intercept splicer may perform manifest-manipulation handling for streaming content types. For example, the transparent intercept splicer can identify stream content by the following attributes: URL patterns (path, extensions), request parameters (cookies, user-agent, client marker), respond content-type, or specific patterns in the body (e.g. EXT-X-VERSION:). It will be appreciated by those skilled in the art that there are multiple formats for HTTP streaming content (e.g., Apple HTTP Live Streaming (HLS), Microsoft Smooth Streaming (HSS), MPEG-DASH, Adobe, etc.). While the HTTP streaming formats have different parsing and tracking methods, the splicing principles are similar.

The transparent intercept splicer may provide an advertisement insertion service on the requested content. Advertisement insertion may include identifying cues in streaming content to manipulate (e.g., EXT-X-SIGNAL-START, spot=?), identifying client attributes for policies and decisions (e.g., IP, user-agent, client fields, etc.), determining advertisement decision policy or getting resolution from advertisement decision servers, adjusting segment references in manifest to stitch in alternate segments, providing notification and analytics to management and validation systems. In embodiments, the transparent intercept splicer may provide a targeted advertisement insertion service, wherein targeted advertisements (e.g., advertisement content that is deemed to be relevant to a specific user or device, or to a specific geographic region within which the requesting user or device is located) are inserted at one or more segments within the requested content.

The transparent intercept splicer can provide additional analysis and manipulation beyond advertisement insertion. For example, a blackout system may be monitored to detect whether streaming segments should be replaced with alternate content. As another example, QoS policies can be enforced such that one class of streaming is guaranteed (or limited) over others. In embodiments, the transparent intercept splicer may modify manifests with markup for companion advertisements, overlays, links, and others. The transparent intercept splicer may also handle transcoding or repackaging of content for different content players. HTML may be modified for GUI mockup or to provide extended player information.

Figure 2:
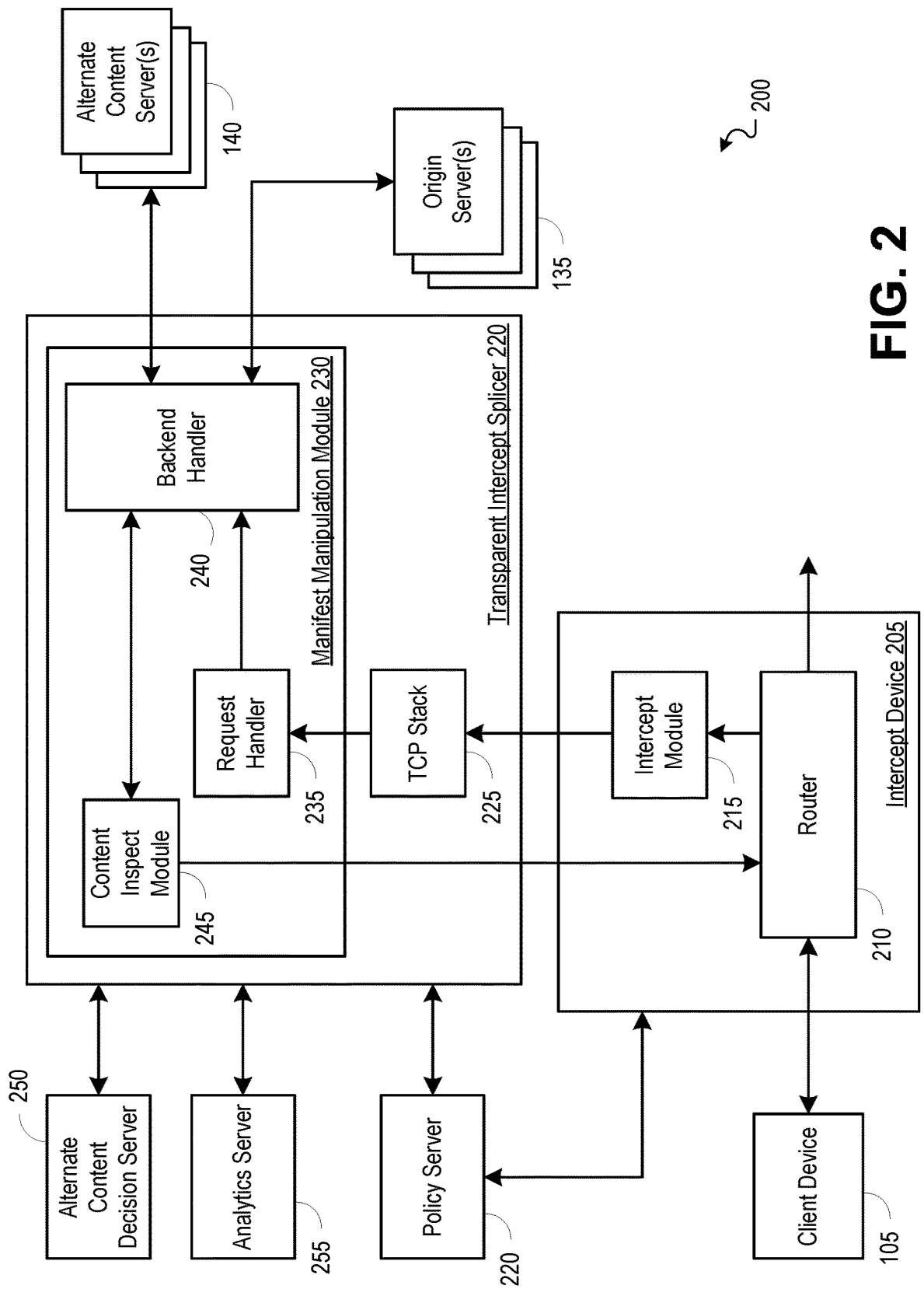
FIG. 2 is a block diagram illustrating an example system operable to facilitate the intercept and manipulation of content requested by a client device.

FIG. 2 is a block diagram illustrating an example system 200 operable to facilitate the intercept and manipulation of content requested by a client device. In embodiments, a user or subscriber may select content through a client device 105, and the client device 105 may output a request for the selected content. It will be appreciated that the selected content may include various types of content (e.g., broadcast or linear video, VoD, stored recordings, streaming video, etc.), and the client device 105 may request that the content be delivered to the client device 105 using adaptive bitrate streaming.

In embodiments, the request for content may be received by an intercept device 205. The intercept device 205 may include a router 210 and an intercept module 215. It should be understood that the intercept device 205 may reside at a central device 125 of FIG. 1 (e.g., headend equipment) or other network component (e.g., load-balancer, content delivery network (CDN) request router, CDN edge cache, etc.). The intercept device 205 may reside in CPE equipment (e.g., STB 110a of FIG. 1, access device 110b of FIG. 1, etc.) or in a software layer to enhance a client device 105.

A content request may be received at the router 210, and the router 210 may identify information associated with the content request. For example, the router 210 may identify the source of the content request, the destination of the content request, the type of content requested, and various other information. The router 210 may identify information associated with the content request based upon information carried by the content request (e.g., header or tag information of a packet carrying the content request).

In embodiments, the router 210 may determine whether a content request is to be intercepted or forwarded to a destination associated with the content request. The router 210 may make the determination whether to intercept the content request or forward the content request to a destination based upon the identified information associated with the content request. For example, the router 210 may be configured to intercept content requests coming from a certain source, content requests having a certain destination, or content requests associated with certain types of content. The router 210 may be configured according to a set of rules or policies identifying criteria for determining whether to intercept or forward a received content request. The set of rules or policies may be retrieved, for example, from a policy server 220.

When the router 210 determines that a content request will not be intercepted, the router 210 can forward the content request to a destination associated with the content request. When the router 210 determines that a content request should be intercepted, the router 210 may pass the content request to an intercept module 215. In embodiments, the intercept module 215 may encapsulate the content request and forward the content request to a transparent intercept splicer 220.

In embodiments, a content request may be intercepted and redirected at the intercept device 205 by determining a next hop router for intercepted, upstream packets. High-speed filtering rules, such as ternary content-addressable memory (TCAM), may be used to select packets for handling, and the intercept device 205 can override the next-hop media access control (MAC) addresses associated with the selected packets, such that the selected packets are addressed and delivered to the transparent intercept splicer 220.

In embodiments, a content request may be intercepted and redirected at the intercept device 205 by performing high-speed filtering to select packets that are to be embedded inside an IP wrapper and routed to one or more transparent intercept splicers 220 on a different network. Packets selected for redirection may be selected based on a destination of the packets (e.g., IP port). For example, specific upstream TCP packets may be selected based upon a destination indicating that the packets are associated with an adaptive bitrate channel. In embodiments, one or more transparent intercept splicers 220 may be configured to update rules for filtering packets at a device intercepting and redirecting the packets.

In embodiments, redirected packets may be routed across networks by encapsulating the packets within an IP wrapper such that the original address and port information associated with the packets may be preserved. It should be understood that various redirect protocols may be used to route selected packets to a transparent intercept splicer 220. For example, packets may be redirected using generic routing encapsulation (GRE), web cache communication protocol (WCCP), and/or any other redirect protocol.

In embodiments, if the return path associated with a selected packet is also encapsulated, then the downstream next-hop MAC address associated with the packet can be determined. For example, a downstream next-hop MAC address may be determined by performing resolution of the network layer address into a link layer address (e.g., using address resolution protocol (ARP)).

It should be understood that other systems and methods may be used for delivery of redirected packets. For example, packets may be delivered over a dedicated network, through a layer-2 MAC address overwrite, over a virtual private network (VPN) tunnel, and others.

In embodiments, a content request may be redirected to one or more transparent intercept splicers 220 based on various factors. Packets may be redirected across a plurality of transparent intercept splicers 220 such that the loads at the splicers may be balanced. A determination may be made as to the status of a transparent intercept splicer 220 such that packets are redirected to active servers. In embodiments, diagnostic and/or monitoring information may be communicated between the intercept device 205 and the one or more transparent intercept splicers 220. Diagnostic and/or monitoring information may be used to track loads at the one or more transparent intercept splicers 220 and to identify and debug issues that may arise at the splicers. The transparent intercept splicer 220 may be built on a web cache framework to support high client request rates.

In embodiments, the transparent intercept splicer may include a transmission control protocol (TCP) stack 225 and a manifest manipulation module 230. It should be understood that the transparent intercept splicer 220 may reside at a central device 125 of FIG. 1 (e.g., headend equipment) or other network component (e.g., load-balancer, content delivery network (CDN) request router, CDN edge cache, etc.). The transparent intercept splicer 220 may reside in CPE equipment (e.g., STB 110a of FIG. 1, access device 110b of FIG. 1, etc.) or in a software layer to enhance a client device 105.

In embodiments, the TCP stack 225 may process the content request such that the content request may be received by the manifest manipulation module 230 instead of the original destination associated with the content request. The TCP stack 225 may extract redirected packets from encapsulation. The origin address associated with the packet or content request may be mapped to an address associated with the transparent intercept splicer 220. An origin address may be mapped to an address associated with the transparent intercept splicer 220 using address translation (e.g., network address translation (NAT) used to allow mapping of the origin IP:port of the origin address to the IP:port configured for the transparent intercept splicer 220). For example, the origin address may be mapped to a transparent intercept splicer 220 address such that the transparent intercept splicer 220 can accept sessions made to other servers. The TCP stack 225 may also allow for the retrieval of the origin IP and port for backside connections. As an example, packets from a WCCP/GRE tunnel may be redirected to a transparent proxy (e.g., a proxy with a default port of 3128) using the following rules:

modprobe ip_gre
    #ip tunnel add wccp0 mode gre remote {Router-External-IP} local {Host-IP} dev {interface}
    #ip addr add {Host-IP}/32 dev wccp0
    #ip link set wccp0 up
    #echo 0>/proc/sys/net/ipv4/conf/wccp0/rp_filter
    #iptables-t nat-A PREROUTING-i wccp0-j REDIRECT-redirect-to 3128

In embodiments, the manifest manipulation module 230 may retrieve requested content and may inspect and/or manipulate the requested content. The manifest manipulation module 230 may include a request handler 235, a backend handler 240, and a content inspect module 245.

The request handler 235 may accept downstream communication sessions that are intended for a different origin. For example, the request handler may accept a content request that was originally targeted for a different origin (e.g., origin server 135). The request handler 235 may retrieve an origin server IP:Port associated with the received content request. For example, the request handler 235 may retrieve an origin server IP:Port from the TCP stack 225. Thus, a default forwarding relay can handle unknown traffic types and minimize side effects when traffic is not being processed. If the request handler 235 detects HTTP traffic, the request handler 235 can conform to relevant parameters and standards. For example, the request handler 235 may add headers for "x-forward-for:" with client IP address and the "Via:" field to identify this proxy type. When performing caching functions, the request handler 235 may honor HTTP caching standards (e.g., standards for refresh, non-cacheable, expiration, etc.). Standard HTTP access logs may provide a source of analytics, monitoring, and diagnostics.

In embodiments, the backend handler 240 may open an upstream session with the origin server IP:port associated with the received content request, and forward the content request and/or subsequent client requests to the origin server.

In embodiments, the manifest manipulation module 230 may forward content and/or origin server responses to the client device 105 from which the content request was received. For example, the content inspect module 245 may forward the content and/or origin server responses to the router 210 of the intercept device 205, and the router 210 can pass the content and/or origin server responses to the client device 105.

In embodiments, the content inspect module 245 may perform manifest-manipulation handling for streaming content. For example, the content inspect module 245 may identify stream content by attributes such as URL patterns (path, extensions, etc.), request parameters (cookies, user-agent, client marker, etc.), respond content-type, specific patterns in the body (e.g., EXT-X-VERSION:), and others. It will be appreciated by those skilled in the art that there are multiple formats for HTTP streaming content (e.g., Apple HTTP Live Streaming (HLS), Microsoft Smooth Streaming (HSS), MPEG-DASH, Adobe, etc.), and parsing, tracking, and splicing methods may be adjusted according to the parameters and attributes of the various HTTP streaming formats.

In embodiments, the content inspect module 245 may replace requested content or one or more specific segments of requested content with alternate content. Replacement of content at the content inspect module 245 may be controlled by rules or parameters retrieved from an alternate content decision server 250. Alternate content may be retrieved from one or more alternate content servers 140 through the backend handler 240. Alternate content may be provided in a variety of qualities and bitrates, and the alternate content decision server 250 may coordinate insertion of the alternate content according to bitrates/qualities of the segments being replaced.

The content inspect module 245 may insert advertisement content at certain segments of requested content by identifying cues in streaming content to manipulate (e.g., EXT-X-SIGNAL-START, spot=?). Advertisement content that is inserted within the requested content may be targeted to a specific user or client device 105 requesting the content. For example, the content inspect module 245 may identify client attributes associated with the content request (e.g., IP address, user-agent, client fields, etc.), determine an advertisement decision policy (e.g., determining advertisement parameters such as type and resolution from information gathered from an alternate content decision server 250 and/or policy server 220), and identify advertisement content that is associated with the identified client attributes (e.g., based on information retrieved from an alternate content decision server 250). The content inspect module 245 may adjust segment references in a manifest to add the advertisement content to the requested content. The content inspect module 245 may output notification of advertisement insertion and/or analytics to management or validation system (e.g., analytics server 255). It will be appreciated that analytics may include various metrics associated with the quality, bitrate, and network impact associated with the one or more services provided to a client device 105.

In embodiments, the content inspect module 245 may recognize advertisement breaks in a content stream. For example, the content inspect module 245 may recognize advertisement break cues embedded in the content stream (e.g., using Society of Cable Telecommunications Engineers (SCTE) 35 standard based cue tracks). In embodiments, the location of an advertisement break within a content stream may be signaled out-of-band using other triggering mechanisms. When an advertisement break is recognized, the manifest manipulation module 230 may communicate with an advertisement service (e.g., placement opportunity information service (POIS)) and/or an advertisement server (e.g., alternate content decision server 250. The manifest manipulation module 230 may collect metadata or other information (e.g., duration, ownership, format, etc.) about an advertisement from the advertisement service and/or server, and may use the information to structure one or more advertisement breaks in a video manifest file.

The content inspect module 245 may replace requested content with an alternate piece of content. For example, a blackout system may be monitored to detect whether streaming segments should be replace with alternate content. The blackout system may dictate that certain subscribers or client devices 105 within a certain region are restricted from viewing certain content, and alternate content may be provided to these certain subscribers or client devices 105.

In embodiments, the content inspect module 245 may enforce quality of service (QoS) policies for certain pieces of content or pieces of content targeted to certain subscribers or client devices 105. For example, QoS policies may be enforced such that one class of streaming is guaranteed (or limited) over others. The QoS policies may be retrieved from a policy server 220. The content inspect module 245 may also monitor and record metrics associated with retrieved and/or output content, and the content inspect module 245 may report observed metrics to an external server (e.g., analytics server 255).

In embodiments, the content inspect module 245 may modify manifests with markups for companion advertisements, overlays, links, and others. The content inspect module 245 may also handle transcoding or repackaging of content for different content players. The content inspect module 245 may modify HTML for graphical user interface (GUI) mockup or to provide extended player information. It should be understood, that the content inspect module 245 may carry out a variety of other actions on content retrieved for delivery to a requesting client device 105.

Figure 3:
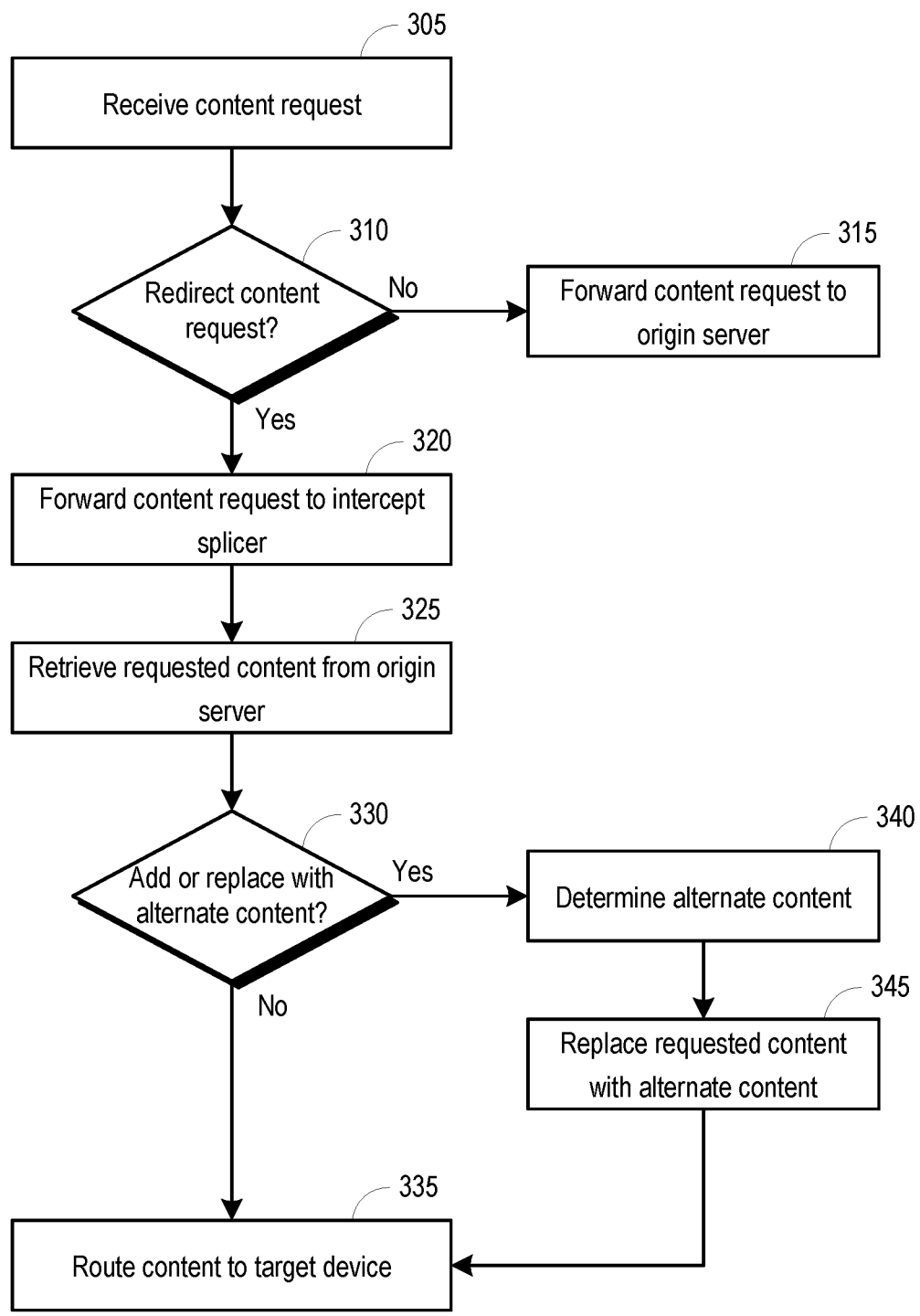
FIG. 3 is a flowchart illustrating an example process operable to facilitate the intercept and manipulation of content requested by a client device.

FIG. 3 is a flowchart illustrating an example process 300 operable to facilitate the intercept and manipulation of content requested by a client device. The process 300 can start at stage 305 when a content request is received. In embodiments, the content request may be received at an intercept device (e.g., intercept device 205 of FIG. 2). The intercept device 205 may reside at a central device 125 of FIG. 1 (e.g., headend equipment) or other network component (e.g., load-balancer, content delivery network (CDN) request router, CDN edge cache, etc.). The intercept device 205 may reside in CPE equipment (e.g., STB 110a of FIG. 1, access device 110b of FIG. 1, etc.) or in a software layer to enhance a client device 105. The content request may identify a selected piece of content or content source and may originate at and be output from a client device (e.g., client device 105 of FIG. 1).

At 310, the determination is made whether to redirect the received content request. The determination whether to redirect the received content request may be made, for example, by a router at the intercept device (e.g., router 210 of FIG. 2). The router 210 may make the determination whether to redirect the content request based upon information carried by the content request (e.g., the source of the content request, the destination of the content request, the type of content requested, and various other information carried by a tag or header associated with the content request). For example, the router 210 may be configured to redirect content requests coming from a certain source, content requests having a certain destination, or content requests associated with certain types of content. The router 210 may be configured according to a set of rules or policies identifying criteria for use in the determination whether to redirect a received request. If the determination is made not to redirect the received content request, the content request may be forwarded to an associated origin server (e.g., destination identified within the content request) at 315.

If, at 310, the determination is made to redirect the received content request, the process 300 can proceed to 320. At 320, the content request may be forwarded to an intercept splicer. In embodiments, the content request may be forwarded to an intercept splicer 220 of FIG. 2 by a router 210 of FIG. 2. Before being output to the intercept splicer 220, the content request may be encapsulated with data for use in the delivery of the content request to the intercept splicer 220 and reception of the content request by the intercept splicer 220. In embodiments, high-speed filtering rules, such as ternary content-addressable memory (TCAM), may be used to select packets for handling, and the intercept device 205 can override the next-hop media access control (MAC) addresses associated with the selected packets, such that the selected packets are addressed and delivered to the intercept splicer 220.

At 325, requested content may be retrieved from an associated origin server. The requested content may be retrieved, for example, by the intercept splicer 220 (e.g., manifest manipulation module 230 of FIG. 2). In embodiments, the manifest manipulation module 230 (e.g., through a backend handler 240 of FIG. 2) may open an upstream session with the origin server (e.g., using an IP:port) associated with the received content request, and may forward the content request and/or subsequent client requests to the origin server.

At 330, the determination may be made whether to add alternate content to the requested content or to replace the requested content with alternate content. The determination may be made, for example, by the manifest manipulation module 230 of FIG. 2. In embodiments, the determination may be made based upon an identification of the user or device requesting the content, the origin server providing the requested content, the type of content received, and/or various other characteristics associated with the content request. For example, rules or policies may control the addition to or replacement of requested content.

If, at 330, the determination is made not to add alternate content to the requested content or to replace the requested content with alternate content, requested content may be routed to a target device at 335. In embodiments, the manifest manipulation module 230 may forward content and/or origin server responses to the target device (e.g., client device 105) from which the content request was received. For example, the manifest manipulation module 230 may forward the content and/or origin server responses to the router 210 of the intercept device 205, and the router 210 can pass the content and/or origin server responses to the client device 105.

Returning to 330, if the determination is made to add alternate content to the requested content or to replace the requested content with alternate content, the process 300 can proceed to 340. At 340, alternate content for adding to or replacing the requested content may be determined. Alternate content may include a targeted advertisement that may be determined to be relevant to a requesting user or device, alternate content to replace the entirety of the requested content (e.g., content replacement at a regional level during an event that is blacked out), or any other content that may be delivered to a requesting user in place of the requested content. Replacement of content may be controlled by rules or parameters retrieved from an alternate content decision server 250 of FIG. 2, and alternate content may be determined based on characteristics of a requesting user or device (e.g., preferences, geographical location, etc.). For example, the content inspect module 245 of FIG. 2 may identify client attributes associated with the content request (e.g., IP address, user-agent, client fields, etc.), determine an advertisement decision policy (e.g., determining advertisement parameters such as type and resolution from information gathered from an alternate content decision server 250 and/or policy server 220), and identify advertisement content that is associated with the identified client attributes (e.g., based on information retrieved from an alternate content decision server 250).

At 345, one or more segments or the entirety of the requested content may be replaced with the alternate content. Requested content may be replaced with alternate content, for example, by the content inspect module 245 of FIG. 2. In embodiments, the content inspect module 245 may insert alternate advertisement content (e.g., targeted advertisement content) at one or more certain segments of the requested content by identifying cues in streaming content to manipulate (e.g., EXT-X-SIGNAL-START, spot=?). The content inspect module 245 may adjust segment references in a manifest to add the alternate content to the requested content.

Figure 4:
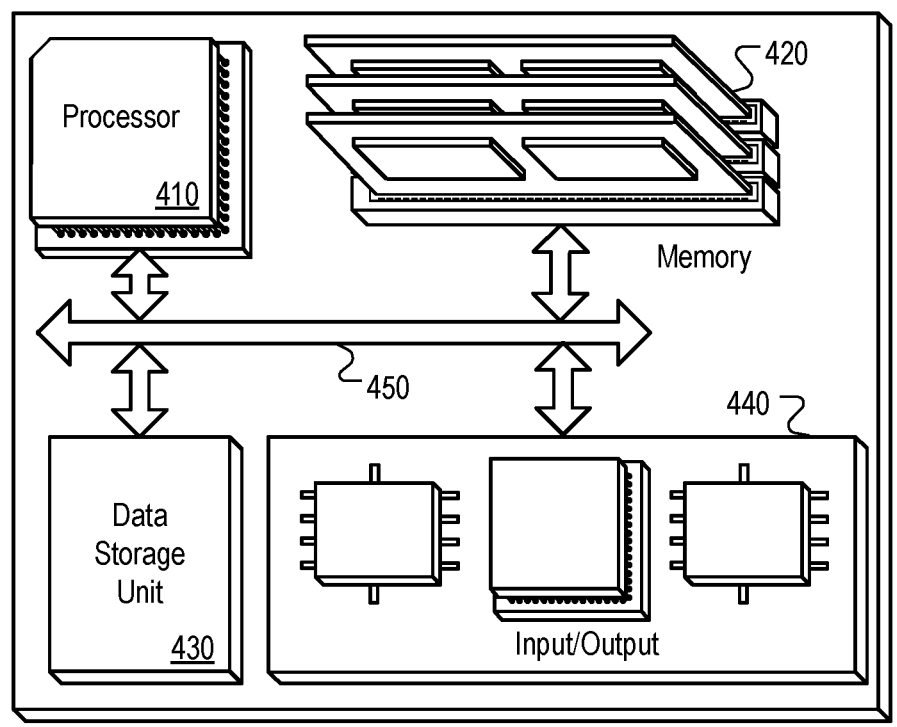
FIG. 4 is a block diagram of a hardware configuration operable to facilitate the intercept and manipulation of content requested by a client device.

FIG. 4 is a block diagram of a hardware configuration 400 operable to facilitate the intercept and manipulation of content requested by a client device. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device (e.g., STB 110a of FIG. 1, access device 110b of FIG. 1, etc.) and/or client device 105a-d of FIG. 1 (e.g, television, computer, tablet, mobile device, etc.). In embodiments, the input/output device can include driver devices configured to send communications to, and receive communications from one or more networks (e.g., local network 115 of FIG. 1, provider network 120 of FIG. 1, WAN 130 of FIG. 1, etc.).

Those skilled in the art will appreciate that the invention improves upon methods and systems for manipulating content requested by a client device. Methods, systems, and computer readable media can be operable to facilitate the intercept and manipulation of content requested by a client device. The methods, systems, and apparatuses described herein enable the interception and redirection of packets based upon a set of rules. Intercepted packets may be redirected away from an origin server and may be forwarded to a splicing device. The splicing device may establish a session with a corresponding origin server, and retrieve content that is requested by the intercepted packet. In embodiments, the splicing device may identify alternate content that is associated with the intercepted packet and/or content that is further associated with a device or subscriber associated with the packet. One or more segments of the requested content, or the entirety of the requested content may be replaced with the alternate content, and the modified content may be output to the client device requesting the content.

The methods, systems, and apparatuses described in this disclosure enable the identification and retrieval of one or more preferred or requested media renditions of multimedia content. A subscriber device can maintain a list of media attributes preferred by the subscriber device and/or one or more users with access to the subscriber device, wherein the list includes preferred media attributes in order from the most requested/received attribute to the least requested/received attribute. When the subscriber device receives a request for multimedia content, the subscriber device can identify one or more media attributes preferred by the subscriber, and media renditions of the multimedia content in each of the identified attributes can be downloaded to the subscriber device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method, comprising:
   receiving a packet at an intercept device, the packet being output from a user device, wherein the packet comprises a request for content comprising video from an origin server, wherein the packet comprises an upstream packet;
   determining whether the packet is to be redirected to an intercept splicer, wherein a determination that the packet is to be redirected to an intercept splicer is made by the intercept device based at least in part on a determination that a destination associated with the packet is associated with an adaptive bitrate channel;

forwarding the packet to the intercept splicer, wherein forwarding the packet to the intercept splicer comprises overriding a next-hop media access control address of the packet such that the packet is addressed and delivered to the intercept splicer;

when a return path associated with the packet is encapsulated, determining a downstream next-hop media access control address associated with the packet by performing a resolution of a network layer address into a link layer address;

establishing a session between the intercept splicer and the origin server; retrieving the requested content from the origin server;

identifying one or more alternate pieces of content, wherein the one or more identified alternate pieces of content are associated with the user device;

replacing at least one segment of the requested content with one or more of the identified alternate pieces of content to generate modified content; and routing the modified content to the user device.

2. The method of claim 1, wherein determining that the packet is to be redirected to an intercept splicer comprises:

identifying the origin server associated with the packet; and matching the identified origin server with an origin server that is identified within a list of origin servers, wherein the list of origin servers dictates that packets requesting content from an origin server within the list of origin servers are to be redirected to the intercept splicer.

3. The method of claim 1, further comprising:

preserving address and port information associated with the packet by encapsulating the packet within a wrapper before forwarding the packet to the intercept splicer.

4. The method of claim 1, wherein the one or more alternate pieces of content comprise one or more targeted advertisements.

5. The method of claim 1, wherein the one or more alternate pieces of content comprise a single piece of content, and the entirety of the requested content is replaced with the single piece of content.

6. The method of claim 1, wherein the one or more identified alternate pieces of content are associated with a geographical location of the user device.

7. The method of claim 1, further comprising:

outputting, to an external server, analytics associated with the replacement of requested content with alternate content.

8. The method of claim 1, wherein the intercept splicer is integrated into the intercept device.

9. A headend device, comprising:

an interface configured to be used to receive a packet, the packet being output from a user device, wherein the packet comprises a request for content comprising video from an origin server, wherein the packet comprises an upstream packet;

an intercept module that:

determines whether the packet is to be redirected to a splicer module, wherein a determination that the packet is to be redirected to an intercept splicer is made based at least in part on a determination that a destination associated with the packet is associated with an adaptive bitrate channel;

forwards the packet to the splicer module, wherein forwarding the packet to the splicer module comprises overriding a next-hop media access control address of the packet such that the packet is addressed and delivered to the splicer module; and when a return path associated with the packet is encapsulated, determines a downstream next-hop media access control address associated with the packet by performing a resolution of a network layer address into a link layer address;

wherein the splicer module is configured to:

establish a session between the splicer module and the origin server; retrieve the requested content from the origin server;

identify one or more alternate pieces of content, wherein the one or more identified alternate pieces of content are associated with the user device; and replace at least one segment of the requested content with one or more of the identified alternate pieces of content to generate modified content; and an interface configured to be used to route the modified content to the user device.

10. The headend device of claim 9, wherein the intercept module is configured to determine that the packet is to be redirected to a splicer module by:

identifying the origin server associated with the packet; and matching the identified origin server with an origin server that is identified within a list of origin servers, wherein the list of origin servers dictates that packets requesting content from an origin server within the list of origin servers are to be redirected to the intercept splicer.

11. The headend device of claim 9, wherein the intercept module is further configured to:

preserve address and port information associated with the packet by encapsulating the packet within a wrapper before forwarding the packet to the splicer module.

12. The headend device of claim 9, wherein the one or more alternate pieces of content comprise one or more targeted advertisements.

13. The headend device of claim 9, wherein the one or more alternate pieces of content comprise a single piece of content, and the entirety of the requested content is replaced with the single piece of content.

14. The headend device of claim 9, wherein the one or more identified alternate pieces of content are associated with a geographical location of the user device.

15. One or more non-transitory computer readable media operable to execute on a processor, the computer readable being operable to cause the processor to perform the operations comprising:

receiving a packet at an intercept device, the packet being output from a user device, wherein the packet comprises a request for content comprising video from an origin server, wherein the packet comprises an upstream packet;

determining whether the packet is to be redirected to an intercept splicer, wherein the determination that the packet is to be redirected to an intercept splicer is made by the intercept device in response to a determination that a destination associated with the packet is associated with an adaptive bitrate channel;

forwarding the packet to the intercept splicer, wherein forwarding the packet to the intercept splicer comprises overriding a next-hop media access control address of the packet such that the packet is addressed and delivered to the intercept splicer;

when a return path associated with the packet is encapsulated, determining a downstream next-hop media access control address associated with the packet by performing a resolution of a network layer address into a link layer address;

establishing a session between the intercept splicer and the origin server;

retrieving the requested content from the origin server;

identifying one or more alternate pieces of content, wherein the one or more identified alternate pieces of content are associated with the user device;

replacing at least one segment of the requested content with one or more of the identified alternate pieces of content to generate modified content; and routing the modified content to the user device.

16. The one or more non-transitory computer-readable media of claim 15, wherein determining that the packet is to be redirected to an intercept splicer comprises:

identifying the origin server associated with the packet; and matching the identified origin server with an origin server that is identified within a list of origin servers, wherein the list of origin servers dictates that packets requesting content from an origin server within the list of origin servers are to be redirected to the intercept splicer.

17. The one or more non-transitory computer-readable media of claim 15, wherein the instructions are further operable to cause one or more processors to perform the operations comprising:

preserving address and port information associated with the packet by encapsulating the packet within a wrapper before forwarding the packet to the intercept splicer.

18. The one or more non-transitory computer-readable media of claim 15, wherein the one or more alternate pieces of content comprise one or more targeted advertisements.

19. The one or more non-transitory computer-readable media of claim 15, wherein the one or more alternate pieces of content comprise a single piece of content, and the entirety of the requested content is replaced with the single piece of content.

20. The one or more non-transitory computer-readable media of claim 15, wherein the one or more identified alternate pieces of content are associated with a geographical location of the user device.

* * * * *